(12) United States Patent
Janczak

(10) Patent No.: US 7,366,153 B2
(45) Date of Patent: Apr. 29, 2008

(54) APPARATUS AND METHOD CAPABLE OF PROVIDING QUALITY OF SERVICE CHANNEL ACCESS IN A WIRELESS NETWORK

(75) Inventor: Tomasz K. Janczak, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 762 days.

(21) Appl. No.: 10/833,464

(22) Filed: Apr. 28, 2004

(65) Prior Publication Data

US 2005/0243788 A1    Nov. 3, 2005

(51) Int. Cl.
*H04Q 7/28* (2006.01)

(52) U.S. Cl. .................. 370/341; 370/329; 455/450
(58) Field of Classification Search ............ 370/230.1, 370/329, 338, 445, 447, 448, 462, 463; 455/450, 455/451, 452.1, 452.2, 455
See application file for complete search history.

(56) References Cited

U.S. PATENT DOCUMENTS

| 2002/0110085 A1* | 8/2002 | Ho et al. ............... 370/230 |
| 2002/0154653 A1* | 10/2002 | Benveniste ............ 370/447 |
| 2002/0163933 A1* | 11/2002 | Benveniste ............ 370/465 |
| 2002/0188750 A1* | 12/2002 | Li ............................ 709/235 |

OTHER PUBLICATIONS

Haas, Zygmunt J., et al., "On Optimizing the Backoff Interval for Random Access Schemes", IEEE Transactions on Communications, vol. 15, No. 12, Dec. 2003.*

* cited by examiner

*Primary Examiner*—Rafael Perez-Gutierrez
*Assistant Examiner*—Abdias Mondesir
(74) *Attorney, Agent, or Firm*—Caven & Aghevli LLC

(57) ABSTRACT

Briefly, in accordance with one embodiment of the invention, an apparatus with capabilities to communicate in a wireless network, comprising a channel access scheme providing access to the wireless network, the access scheme using a modulo N backoff scheme providing a modulo N backoff; and the channel access scheme further providing traffic prioritization.

44 Claims, 5 Drawing Sheets

APPARATUS AND METHOD CAPABLE OF PROVIDING QUALITY OF SERVICE CHANNEL ACCESS IN A WIRELESS NETWORK

BACKGROUND

Wireless networks are superior to wired networks with regard to aspects such as ease of installation and flexibility. They do, however, suffer from lower bandwidth, higher delays, higher bit-error rates, and higher costs than wired networks. With the advent of Wireless Local Area Networks (WLANs), bandwidth has increased and prices have decreased on wireless networking solutions. These factors have made WLANs a very popular wireless networking solution. Given the coverage and low price, it is likely that demands for the ability to run real-time applications such as voice over IP over these networks will increase. If such applications are to become usable, considering the characteristics of wireless networks, some kind of service differentiation may be employed to let certain types of traffic get better performance.

The Institute of Electrical and Electronics Engineers (IEEE) 802.11 standard for WLANs is the most widely used WLAN standard today. Since it may use a shared medium, it has some inherent problems, such as low medium utilization, risk of collisions and problem of providing differentiation between different types of traffic. There is a mode of operation in IEEE 802.11 that may be used to provide service differentiation, but it has been shown to perform poorly and give poor link utilization. Thus, there is an ongoing need in wireless communications for better wireless networks with improved service differentiation.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
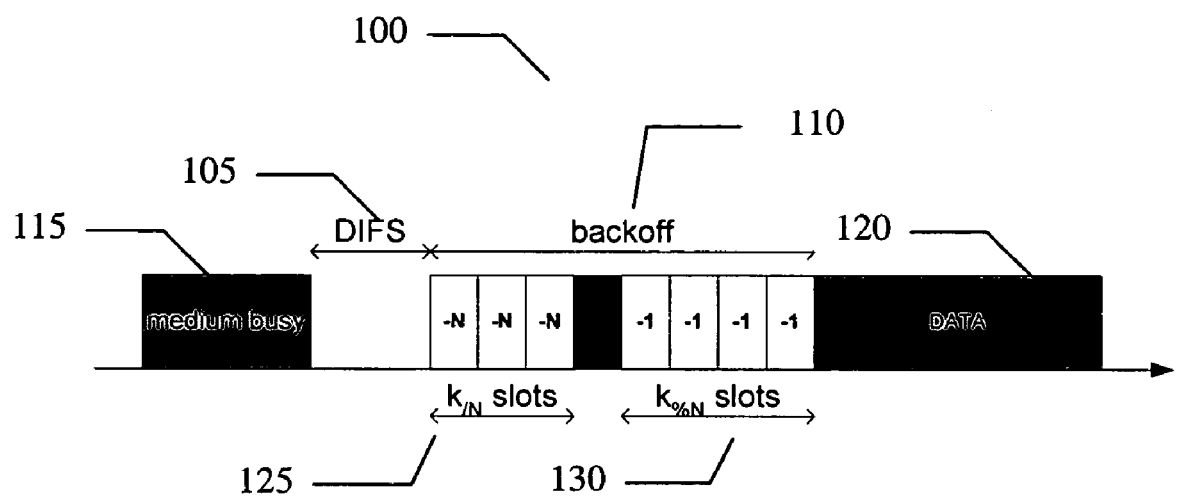
FIG. 1 illustrates the "modulo N" backoff applied to legacy 802.11 networks.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicate that two or more elements are in either direct or indirect (with other intervening elements between them) physical or electrical contact with each other, and/or that the two or more elements co-operate or interact with each other (e.g. as in a cause an effect relationship).

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), wireless local area networks (WLAN), personal area networks (PAN, and the like).

One IEEE 802.11 access method in a wireless local area network is the mandatory Distributed Coordinator Function (DCF). Although the DCF access method is described herein, it is understood that all now known or later developed access methods are intended to be included within the scope of the present invention. The DCF is the basic access mechanism of IEEE 802.11. It uses a Carrier Sense Multiple Access with Collision Avoidance (CSMAICA) algorithm to mediate the access to the shared medium. Before a data frame is sent, the station senses the medium. If it is idle for at least a DCF interframe space (DIFS) period of time, the frame is transmitted. Otherwise, a backoff time B (measured in time slots) is chosen randomly in the interval [0, CW], where CW may be referred to as the Contention Window. Although the term CW is used herein, it is not meant to limit the possibilities of chosen intervals and is used herein only as a convenient term used in the art for periods of time of possible contention in access mechanisms.

After the medium has been detected idle for at least a DIFS, the backoff timer may be decremented by one for each time slot the medium remains idle. If the medium becomes busy during the backoff process, the backoff timer may be paused, and may be restarted when the medium has been sensed idle for a DIFS again. When the backoff timer reaches zero, the frame may be transmitted. Upon detection of a collision (which may be detected by the absence of an acknowledgment frame to the data frame), the contention window may be doubled according to $CW_i=2^{k+i-1}-1$, where i may be the number of attempts (including the current one) to transmit the frame that has been done, and k may be a constant defining the minimum contention window, $CW_{min}=2^k-1$. Further, CW may be doubled until it reaches a predefined maximum value and such value may be CWmax =1023 in DCF. A new backoff time may then chosen and the backoff procedure starts over. The backoff mechanism may also be used after a successful transmission before sending the next frame. After a successful transmission, the contention window may be reset to $CW_{min}$.

Task group E of the IEEE 802.11 working group are currently working on an extension to the IEEE 802.11 standard, called IEEE 802.11e. The goal of this extension is to enhance the access mechanisms of IEEE 802.11 and provide a distributed access mechanism that may provide service differentiation. A new access mechanism called Enhanced DCF (EDCF) has been selected. This is an extension of the basic DCF access mechanism in the original standard. Since devices complying with the old standard are widely deployed, great care was taken to ensure that EDCF should be inter-operable with the old DCF. The EDCF mechanism allows traffic to be classified into 4 different traffic classes (although the present invention is not limited by this number of classes as any number of classes are anticipated to be covered by the present invention; including previous versions of 802.11 e which specify classes such as 8), by modifying the minimum contention window ($CW_{min}$) and the interframe space used for sensing the channel idle condition. Choosing a smaller default contention window for a station will cause that station to generate shorter backoff intervals, thus gaining priority over a station with a larger $CW_{min}$ which generates longer backoff intervals. Further, CWmax values may be differentiated on a per-category class. Although, the scope of the present invention is not limited to this.

To be able to further differentiate between stations using the same contention window, different interframe spaces may bee used by different traffic classes. Instead of waiting a DIFS before trying to access the medium, or starting to decrement the backoff timer as in ordinary DCF, an interframe space called Arbitration lnterframe Space (AIFS) may be used. Each traffic class may use its own AIFS which equals a DIFS plus a number of time slots (possibly zero). This means that traffic using a large AIFS (many "extra" time slots) will have lower priority than traffic using a small AIFS, since they will wait longer before trying to access the medium or starting to decrement the backoff timer.

The present invention may incorporate mechanisms incorporating EDCF approaches that use different backoff algorithms and interframe spaces for different priority levels. Thus, in one embodiment of the present invention the "modulo N" backoff may be aligned with the EDCF algorithm of 802.11e.

FIG. 1, illustrated generally as 100, shows the "modulo N" backoff applied to legacy 802.11 networks. The medium being busy is shown as 115. The backoff counter k (shown cumulatively as 110) may be divided modulo N into an integer part $k_{/N}$ 125 and a fractional part $k_{\% \ N}$ 130. After DIFS 105 interval, a station senses a radio channel for the duration of $k_{/N}$ slots 125 and decrements the backoff counter by N at the end of each idle slot. If the channel remains idle, a station may issue one-slot burst after $k_{/N}$ slots 125. Next, it waits $k_{\% \ N}$ idle slots 130. In this phase, a station may decrement the backoff counter by 1 in each idle slot. Although, it should be understood that the decrement number is not limited to 1 and it is anticipated that other decrement numbers can be utilized. A station may commence transmission as soon as the backoff counter reaches 0. If a station detects any foreign packet transmission during its own idle slots, it may defer until the next access cycle. The data is depicted at 120.

Figure 2:
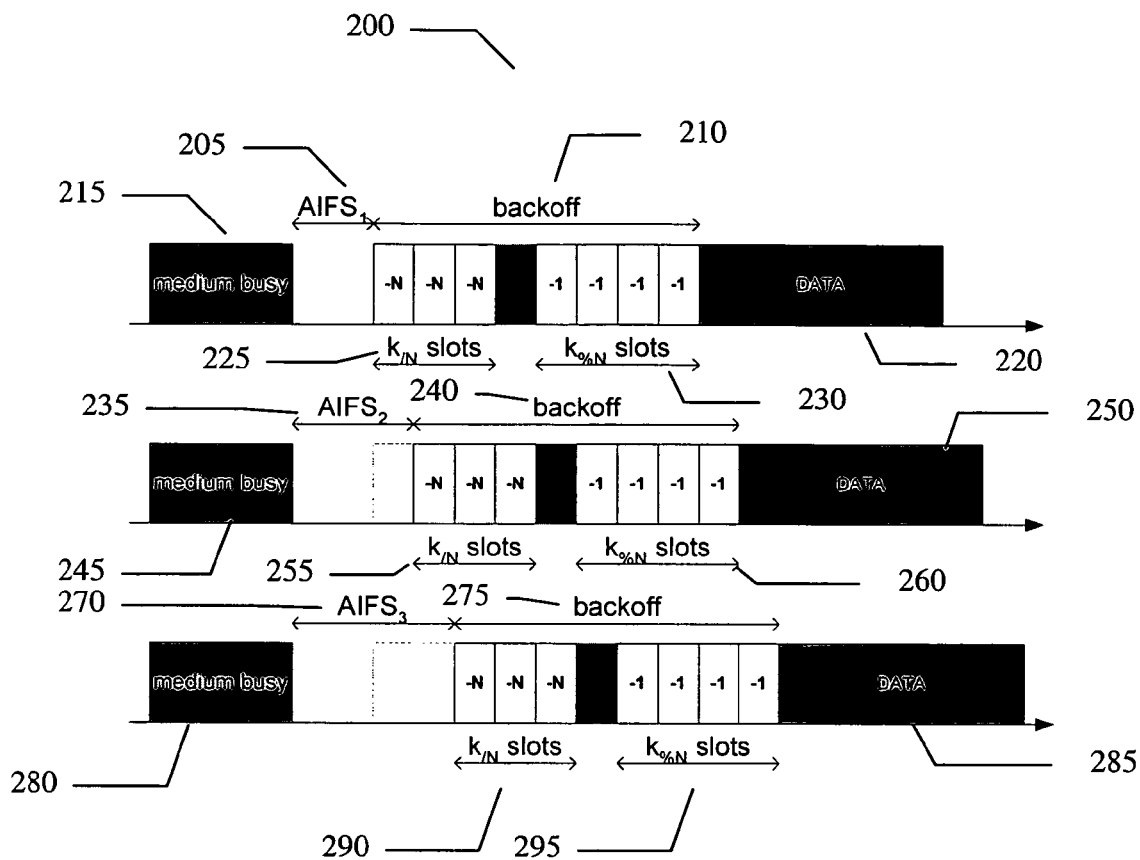
FIG. 2 illustrates one embodiment of the "modulo N" scheme augmented with Quality of Service (QoS) differentiation.

FIG. 2, illustrates generally at 200 the, aforementioned "modulo N" scheme augmented with QoS differentiation and in one embodiment may replace the DIFS 125 interval with AIFS intervals 205, 235 and 270 defined on a per-class basis.

This enables in one embodiment of the present invention an apparatus capable of communication in a wireless network, comprising a channel access scheme providing access to the wireless network, the access scheme may use a modulo N backoff scheme 200 providing a modulo N backoff (210, 240 and 275); and the channel access scheme may further provide traffic prioritization. The traffic prioritization may be accomplished by using an AIFS interval (205, 235 and 270) defined on a per-class basis and one slot difference in AIFS intervals (205, 235 and 270) may correspond to an N-value difference in backoff counters in the modulo N backoff scheme 200. The modulo N backoff may be aligned with an EDCF algorithm and the AIFS interval (205, 235 and 270) may replace a DFIS interval 105.

In one embodiment of the present invention a backoff (210, 240 and 275) counter may take place at the beginning of a foreign transmission period and a contention window associated with the channel access scheme may have a window range of <0,3> and the modulo N may be modulo 4 which may increase the probability of strict-priority precedence of real-time traffic over non-real time packets (as long as initial CW for real-time packets is not increased e.g. due to collisions). However, it is understood that the access window may have many alternate ranges and the modulo number may be any number depending on the parameters desired. Thus, the example of window range referred to above and the modulo number should not be read to limit the present invention in any way. The medium busy for AIFS intervals 1, 2 and 3 (205, 235 and 270) defined on a per-class basis are shown at 215 for $AIFS_1$, 245 for $AIFS_2$ and 280 for $AIFS_3$. $K_{/N}$ slots and $k_{\%\ N}$ slots for $AIFS_1$ are shown at 225 and 230 respectively; $K_{/N}$ slots and $k_{\%\ N}$ slots for $AIFS_2$ are shown at 255 and 260 respectively; $K_{/N}$ slots and $k_{\%\ N}$ slots for $AIFS_1$ are shown at 290 and 295 respectively. Data for AIFS intervals 1, 2 and 3 (205, 235 and 270) defined on a per-class basis are shown at 220 for $AIFS_1$, 250 for $AIFS_2$ and 285 for $AIFS_3$.

Figure 3:
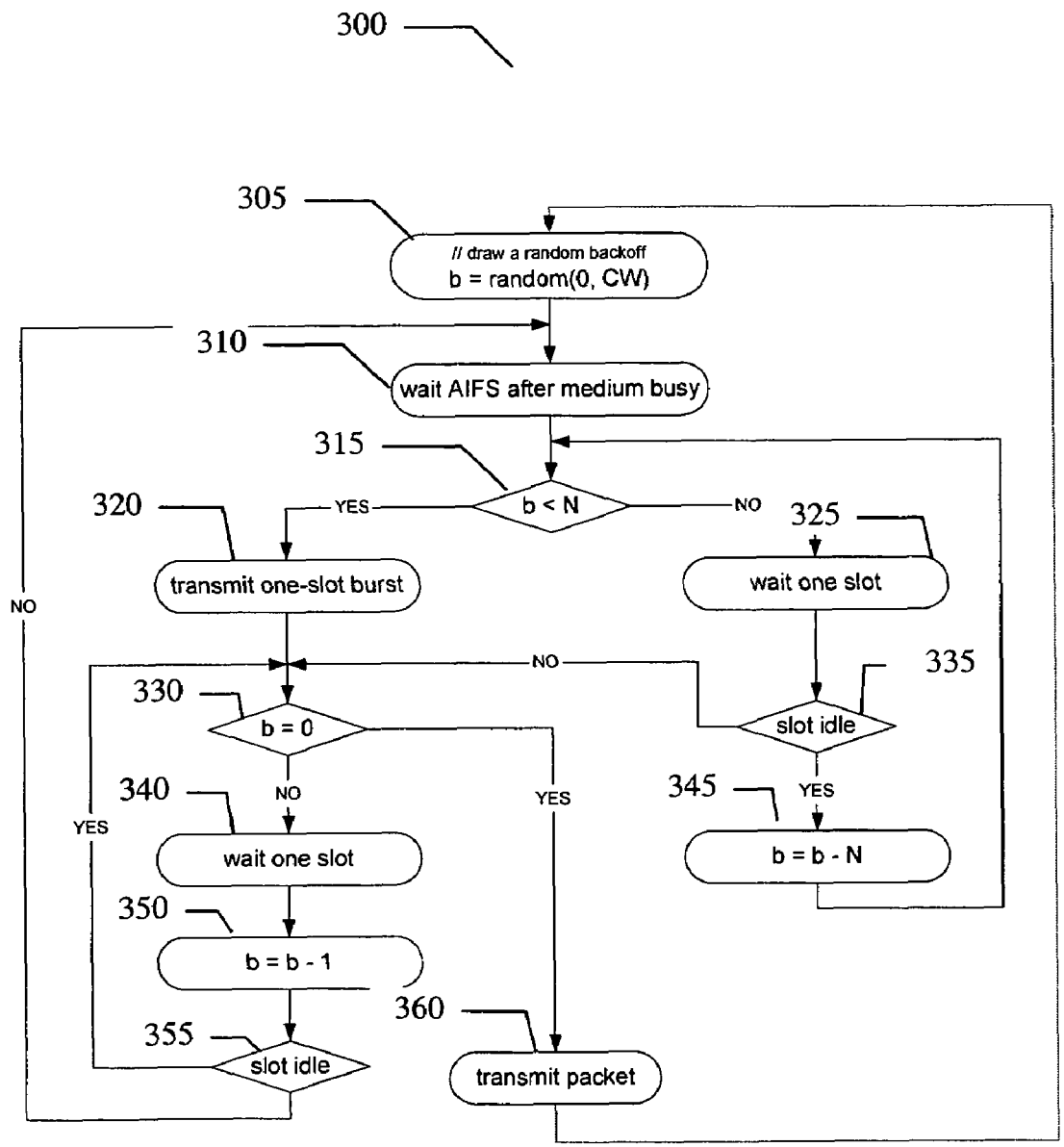
FIG. 3 is a flow chart of one embodiment of the prioritized "Modulo N" Channel Access Algorithm.

Turning now to FIG. 3, in one embodiment of the present invention, the access scheme using a modulo N backoff scheme 200 providing a modulo N backoff (210, 240 and 275) with prioritization may comprise:

(a) setting b=random[0, CW] (305);

(b) waiting AIFS after medium busy (310);

(c) transmitting one slot burst (320) if b<N (315), and if b=0 (330) transmitting a packet (360); if b≠0, wait one slot (340), set b=b−1 (350) and, if slot is idle (355), repeat until b=0 (330); if slot is not idle, return to step (b) (305); and (d) waiting one slot (if b≧N (315), and, if slot is idle (355), setting b=b−N (345) and repeating until b<N (315); if slot is not idle (335), determine if b=0 (330) and if so, transmit packet (360); if b≠0 (330), wait one slot (340), set b=b−1 (350) and, if slot idle (355), repeat until b=0 (330); if slot is not idle (355) return to step (b) (310).

It is appreciated that this is but one algorithm for illustrative purposes and other algorithms may be utilized without falling outside the scope of the present invention. A station may decrement its backoff counter both at the end of an idle slot as well as during a foreign transmission period (i.e. a packet exchange sequence started by another station). Decrementing may take place at the beginning of a foreign transmission period (i.e. one slot after transmission starts), and not when AIFS (205, 235 and 270) expires.

In one embodiment of the present invention, the number of backoff slots, which may or may not match 1:1 with the backoff counter value (and indeed may be −N times smaller) in the access scheme using a modulo N backoff scheme may be expressed as:

$$MBLk,N=[k/N]+1+(k\ mod\ N)$$

where, k=a drawn random backoff counter,

N=modulo number.

Again, it is understood that numerous ways to determine the number of backoff slots exist and the above is but one example of numerous possibilities. One main strength of the "modulo N" is the possibility to change the way CW increases. The modulo N backoff scheme may be augmented with a modified CW increase scheme, shortly denoted as "modulo N/$CW_{inc\_factor}$/$CW_{inc\_limit}$" scheme. In one embodiment this may be a modulo 4/4/4, although it is appreciated that different combinations of backoff scheme modulo numbers, $CW_{inc\_factor}$ and $CW_{inc\_limit}$ factors may exist. The following definitions may apply:

CWinc_factor=Contention Window increase factor after collision (for DCF & EDCF; CWinc_factor=2);

CWinc_limit=maximum number of Contention Window increases after consecutive collisions (for DCF; CWinc_limit=6; for EDCF this is already variable parameter, depending on the access category);

N is the "modulo N" parameter.

The following exemplifies, but is meant in no way to limit the scope of, the modulo 4/4/4. Here, "4/4/4" means:

1) use "modulo 4"

2) after each collision increase CW 4 times (not 2 times as in DCF)

3) increase CW at maximum 4 times (not 6 times as in DCF).

Assuming CWmin=15, we get:

$$CWmax=(CWmin+1)*4^4-1=16*256-1=4095$$

But the maximum number of physical backoff slots remains close to DCF:

$$MBLk,N\sim4095/4+1=1024$$

So, there is provided virtually the same maximum range of physical time slots as in DCF, and at the same time the logical CW backoff counter range is increased four times. As the backoff counters are drawn from the wider CW range, the probability of collision (two stations draw the same backoff value) is lower; and hence the channel utilization ratio is higher.

Experimentation and simulation establish that "modulo 4/4/4" outperforms legacy DCF by up to 23%, depending on the number of concurrently competing stations and packet sizes. Further, the simulations show that "modulo 4/4/4" does not perform worse than DCF under any traffic conditions.

Figure 4:
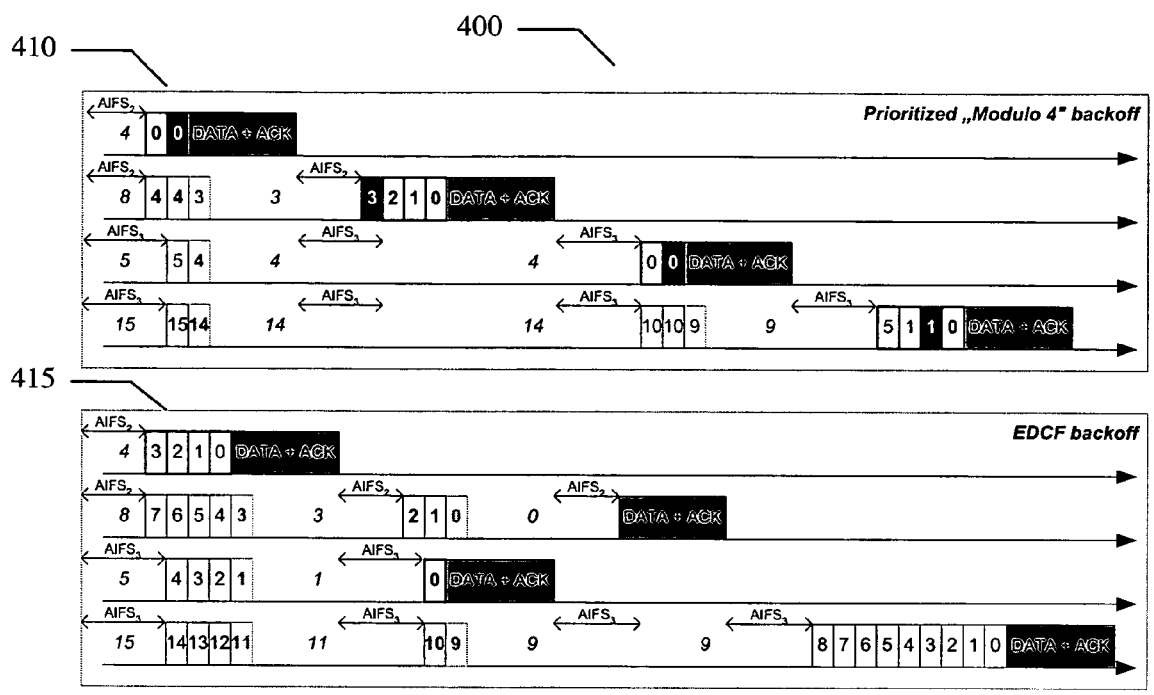
FIG. 4 shows one embodiment of four wireless stations using the "Modulo 4" Channel Access Algorithm and an original EDCF backoff and FIG. 5 illustrates an embodiment of a wireless environment.
Figure 5:
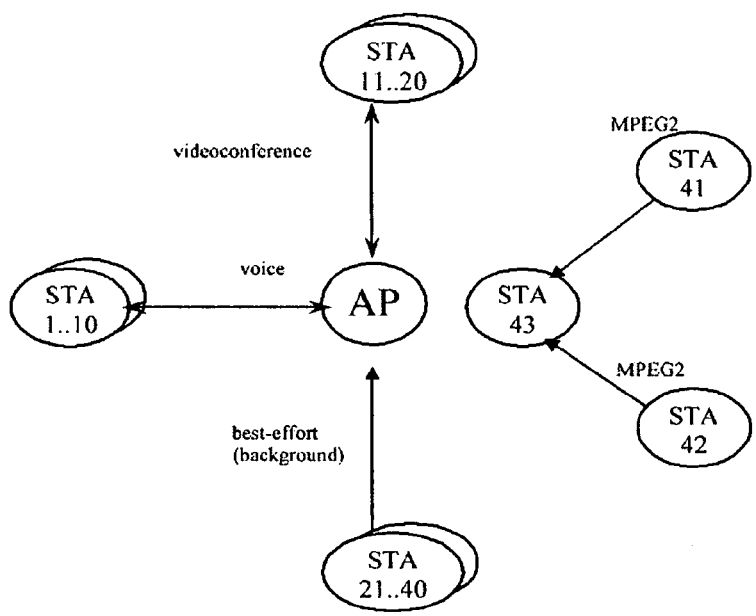

This is elaborated on in FIG. 4, shown generally as 400, which illustrates a network scenario with four wireless stations that use the prioritized "modulo 4" 410 and an original EDCF backoff 415. White boxes indicate idle slots, black boxes represent busy slots and gray boxes indicate slots that would be idle if another station did not start foreign transmission. The numbers left to the slot boxes show backoff counters at the beginning of an access cycle. Numbers inside boxes correspond to the current backoff value (end of slot for "modulo N" and start of slot for EDCF). It must be appreciated that this Modulo 4 example shown in FIG. 4 is but one of numerous modulo N methodologies and the specific numbers herein are provided here for exemplification only.

The prioritized "modulo N" may provide more stringent AIFS-based differentiation as compared with original EDCF. This is because a one-slot difference in AIFS (205, 235 and 270) intervals may correspond to N-value difference in backoff (210, 240 and 275) counters in the "modulo N" scheme 200. Consider high-priority stations (AIFSN=2) and low-priority station (AIFSN=3) as depicted in FIG. 4. In the very first frame exchange, the high-priority station 2 decrements the backoff counter by 5, while the low priority stations 3 and 4 decrement their counters by only one. In the original EDCF, the low-priority stations would decrement their backoff counters by 4 which is not much less than 5 for a high-priority station.

In general, a high-priority EDCF station may be sure of a contention-free channel access only if its backoff counter is already equal to 0 when AIFS expires. Conversely, transmission from a high-priority "modulo N" station may not be affected by low-priority stations for all backoff counters less than N. The second frame exchange in FIG. 4 is an example. The high-priority station 2 has a backoff equal to 3, which may be enough to prevent low-priority stations from transmission in this access cycle (even though they had lower backoffs initially). This may not be possible in the original EDCF. Consider again the second frame exchange. In EDCF, the high-priority station (backoff=3) looses competition with a low-priority station (backoff=1).

One embodiment of the present invention also provides a method of providing prioritized access to a wireless network, comprising providing a channel access scheme using a modulo N backoff scheme 200 providing a modulo N backoff (210, 240 and 275); and prioritizing traffic seeking access to the wireless network. In one embodiment, the traffic prioritization may be accomplished by using an AIFS interval (205, 235 and 270) defined on a per-class basis and wherein one slot difference in the AIFS intervals (205, 235 and 270) may correspond to the N-value difference in backoff (210, 240 and 275) counters in the modulo N backoff scheme 200.

Further, in one embodiment the modulo N backoff may be aligned with an EDCF algorithm and the AIFS interval (205, 235 and 270) may replace a DFIS interval 105.

In another embodiment of the present invention is provided an article comprising a storage medium having stored thereon instructions, that, when executed by a computing platform, establishes a channel access scheme providing access to a wireless network, the access scheme may use a modulo N backoff scheme 200 providing a modulo N backoff (210, 240 and 275); and the channel access scheme may further provide traffic prioritization. The traffic prioritization may be accomplished by using an AIFS interval (205, 235 and 270) defined on a per-class basis wherein one slot difference in AIFS intervals (205, 235 and 270) may correspond to N-value difference in backoff (210, 240 and 275) counters in the modulo N backoff scheme 200.

In the article of one embodiment of the present invention, the decrementing a backoff counter may take place at the beginning of a foreign transmission period.

One embodiment of the present invention provides a system capable of prioritizing traffic access to a wireless network, comprising a channel access scheme which provides access to the wireless network; the channel access scheme using a modulo N backoff scheme 200 providing a modulo N backoff (210, 240 and 275); and the prioritization may be accomplished by using an AIFS interval (205, 235 and 270) defined on a per-class basis and wherein the AIFS intervals (205, 235 and 270) may correspond to N-value difference in backoff counters in the modulo N backoff scheme 200.

Also provided in the present invention are computer-executable instructions stored on a computer-readable storage medium for providing a Quality of Service (QoS) service prioritization to a wireless station in a wireless network, the computer-executable instructions comprising: providing a channel access scheme using a modulo N backoff scheme 200 providing a modulo N backoff (210, 240 and 275); and prioritizing traffic seeking access to the wireless network by using an AIFS interval (205, 235 and 270) defined on a per-class basis, wherein one slot difference in the AIFS intervals (205, 235 and 270) correspond to N-value difference in backoff counters in the modulo N backoff scheme 200. Further, the decrementing a backoff counter may take place at the beginning of a foreign transmission period.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. An apparatus, comprising:
 a storage device to store data corresponding to a channel access scheme providing access to a wireless network, said access scheme using a modulo N backoff scheme providing a modulo N backoff; and
 said channel access scheme further providing traffic prioritization,
 wherein one slot difference in AIFS intervals correspond to N-value difference in backoff counters in said modulo N backoff scheme.

2. The apparatus of claim 1, wherein said traffic prioritization is accomplished by using an AIFS interval defined on a per-class basis.

3. The apparatus of claim 1, wherein said modulo N backoff is aligned with an EDCF algorithm.

4. The apparatus of claim 1, wherein said AIFS interval replaced a DFIS interval.

5. The apparatus of claim 2, wherein decrementing a backoff counter takes place at the beginning or end of a foreign transmission period.

6. The apparatus of claim 2, wherein a contention window associated with said channel access scheme has a window range of <0,3> and said modulo N is modulo 4 improving the probability of strict-priority precedence of real-time traffic over non-real time packets.

7. The apparatus of claim 2, wherein said access scheme using a modulo N backoff scheme providing a modulo N backoff with prioritization comprises:
 (a) setting b=random(0, CW);
 (b) waiting AIFS after medium busy;
 (c) transmitting one slot burst if b<N, and if b=0 transmitting a packet; if b≠0, wait one slot, set b=b−1 and, if slot is idle, repeat until b=0; if slot is not idle, return to step (b); and
 (d) waiting one slot if b≧N and if slot is idle, setting b=b−N and repeating until b<N; if slot is not idle, determine if b=0 and if so, transmit packet; if b≠0, wait one slot, set b=b−1 and, if slot idle, repeat until b=0; if slot is not idle return to step (b).

8. The apparatus of claim 2, wherein the number of backoff slots in said access scheme using a modulo N backoff scheme is expressed as:

$$MBL_{k,N} = [k/N]+1 +(k \bmod N)$$

where,
k=a drawn random backoff counter,
N=modulo number.

9. The apparatus of claim 2, wherein said modulo N backoff scheme is a modulo 4 scheme and wherein said CW is quadrupled after each collision to a maximum of 4 CW increases.

10. A method, comprising:
providing a channel access scheme to a wireless network, said access scheme using a modulo N backoff scheme providing a modulo N backoff; and
prioritizing traffic seeking access to said wireless network,
wherein one slot difference in AIFS intervals correspond to N-value difference in backoff counters in said modulo N backoff scheme.

11. The method of claim 10, wherein said traffic prioritization is accomplished by using an AIFS interval defined on a per-class basis.

12. The method of claim 10, wherein said modulo N backoff is aligned with an EDCF algorithm.

13. The method of claim 10, wherein said AIFS interval replaced a DFIS interval.

14. The method of claim 11, wherein decrementing a backoff counter takes place at the beginning of a foreign transmission period.

15. The method of claim 11, wherein a contention window associated with said channel access scheme has a window range of <0,3> and said modulo N is modulo 4 ensuring strict-priority precedence of real-time traffic over non-real time packets.

16. The method of claim 11, wherein said access scheme using a modulo N backoff scheme providing a modulo N backoff with prioritization comprises:
(a) setting b=random(0, CW);
(b) waiting AIFS after medium busy;
(c) transmitting one slot burst if b<N, and if b=0 transmitting a packet; if b≠0, wait one slot, set b=b−1 and, if slot is idle, repeat until b=0; if slot is not idle, return to step (b); and
(d) waiting one slot if b≧N and if slot is idle, setting b=b−N and repeating until b<N; if slot is not idle, determine if b=0 and if so, transmit packet; if b≠0, wait one slot, set b=b−1 and, if slot idle, repeat until b=0; if slot is not idle return to step (b).

17. The method of claim 11, wherein the number of backoff slots in said access scheme using a modulo N backoff scheme is expressed as:

$$MBL_{k,N} = [k/N]+1+(k \bmod N)$$

where,
k=a drawn random backoff counter,
N=modulo number.

18. The method of claim 11, wherein said modulo N backoff scheme is a modulo 4/4/4.

19. An article comprising a storage medium having stored thereon instructions, that, when executed by a computing platform, establishes a channel access scheme providing access to a wireless network, said access scheme using a modulo N backoff scheme providing a modulo N backoff; and said channel access scheme further providing traffic prioritization,
wherein one slot difference in AIFS intervals correspond to N-value difference in backoff counters in said modulo N backoff scheme.

20. The article of claim 19, wherein said traffic prioritization is accomplished by using an AIFS interval defined on a per-class basis.

21. The article of claim 19, wherein said modulo N backoff is aligned with an EDCF algorithm.

22. The article of claim 19, wherein said AIFS interval replaced a DFIS interval.

23. The article of claim 20, wherein decrementing a backoff counter takes place at the beginning of a foreign transmission period.

24. The article of claim 20, wherein a contention window associated with said channel access scheme has a window range of <0,3> and said modulo N is modulo 4 ensuring strict-priority precedence of real-time traffic over non-real time packets.

25. The article of claim 20, wherein said access scheme using a modulo N backoff scheme providing a modulo N backoff with prioritization comprises:
(a) setting b=random(0, CW);
(b) waiting AIFS after medium busy;
(c) transmitting one slot burst if b<N, and if b=0 transmitting a packet; if b≠0, wait one slot, set b=b−1 and, if slot is idle, repeat until b=0; if slot is not idle, return to step (b); and
(d) waiting one slot if b≧N and if slot is idle, setting b=b−N and repeating until b<N; if slot is not idle, determine if b=0 and if so, transmit packet; if b≠0, wait one slot, set b=b−1 and, if slot idle, repeat until b=0; if slot is not idle return to step (b).

26. The article of claim 20, wherein the number of backoff slots in said access scheme using a modulo N backoff scheme is expressed as:

$$MBL_{k,N}=[k/N]+1+(k \bmod N)$$

where,
k=a drawn random backoff counter,
N=modulo number.
in a wireless communication environment, protection-capable and non-protection-capable Management Frames, said protection-capable Management Frames being protected.

27. A system, comprising:
said system capable of prioritizing traffic access to a wireless network,
a storage device to store data corresponding to a channel access scheme which provides access to said wireless network; said channel access scheme using a modulo N backoff scheme providing a modulo N backoff; and
said prioritization is accomplished by using an AIFS interval defined on a per-class basis and wherein said AIFS intervals correspond to N-value difference in backoff counters in said modulo N backoff scheme, wherein one slot difference in AIFS intervals correspond to N-value difference in backoff counters in said modulo N backoff scheme.

28. The system of claim 27, wherein said modulo N backoff is aligned with an EDCF algorithm.

29. The system of claim 27, wherein said AIFS interval replaced a DFIS interval.

30. The system of claim 27, wherein decrementing a backoff counter takes place at the beginning of a foreign transmission period.

31. The system of claim 27, wherein a contention window associated with said channel access scheme has a window range of <0,3> and said modulo N is modulo 4 ensuring strict-priority precedence of real-time traffic over non-real time packets.

32. The system of claim 27, wherein said access scheme using a modulo N backoff scheme providing a modulo N backoff with prioritization comprises:
   (a) setting b random(0, CW);
   (b) waiting AIFS after medium busy;
   (c) transmitting one slot burst if b<N, and if b=0 transmitting a packet; if b≠0, wait one slot, set b=b−1 and, if slot is idle, repeat until b=0; if slot is not idle, return to step (b); and
   (d) waiting one slot if b≧N and if slot is idle, setting b=b−N and repeating until b<N; if slot is not idle, determine if b=0 and if so, transmit packet; if b≠0, wait one slot, set b=b−1 and, if slot idle, repeat until b=0; if slot is not idle return to step (b).

33. The system of claim 27, wherein the number of backoff slots in said access scheme using a modulo N backoff scheme is expressed as:

$MBL_{k,N} = [k/N] + 1 + (k \bmod N)$ where,
k=a drawn random backoff counter,
N=modulo number.

34. Computer-executable instructions stored on a computer-readable storage medium for providing a Quality of Service (QoS) service prioritization to a wireless station in a wireless network, said computer-executable instructions comprising:
   providing a channel access scheme using a modulo N backoff scheme providing a modulo N backoff; and
   prioritizing traffic seeking access to said wireless network by using an AIFS interval defined on a per-class basis, wherein one slot difference in said AIFS intervals correspond to N-value difference in backoff counters in said modulo N backoff scheme.

35. The computer-executable instructions stored on a computer-readable storage medium of claim 34, wherein decrementing a backoff counter takes place at the beginning of a foreign transmission period.

36. The computer-executable instructions stored on a computer-readable storage medium of claim 34, wherein a contention window associated with said channel access scheme has a window range of <0,3> and said modulo N is modulo 4 ensuring strict-priority precedence of real-time traffic over non-real time packets.

37. The computer-executable instructions stored on a computer-readable storage medium of claim 34, wherein said access scheme using a modulo N backoff scheme providing a modulo N backoff with prioritization comprises:
   (a) setting b=random(0, CW);
   (b) waiting AIFS after medium busy;
   (c) transmitting one slot burst if b<N, and if b=0 transmitting a packet; if b≠0, wait one slot, set b=b−1 and, if slot is idle, repeat until b=0; if slot is not idle, return to step (b); and
   (d) waiting one slot if b>N, and, if slot is idle, setting b=b−N and repeating until b <N; if slot is not idle, determine if b=0 and if so, transmit packet; if b≠0, wait one slot, set b=b−1 and, if slot idle, repeat until b=0; if slot is not idle return to step (b).

38. The computer-executable instructions stored on a computer-readable storage medium of claim 34, wherein the number of backoff slots in said access scheme using a modulo N backoff scheme is expressed as:

$MBL_{k,N} = [k/N] + 1 + (k \bmod N)$ where,
k=a drawn random backoff counter,
N=modulo number.

39. The apparatus of claim 1, wherein said wireless network is a wireless local area network (WLAN).

40. The method of claim 10, wherein said wireless network is a wireless local area network (WLAN).

41. The article of claim 19, wherein said wireless network is a wireless local area network (WLAN).

42. The system of claim 27, wherein said wireless network is a wireless local area network (WLAN).

43. The computer-executable instructions stored on a computer-readable storage medium of claim 34, wherein said wireless network is a wireless local area network (WLAN).

44. The apparatus of claim 1, wherein said modulo N backoff scheme is augmented with a modified CW increase scheme, modulo N/GWinc_factor/CWinc_limit.

* * * * *

UNITED STATES PATENT AND TRADEMARK OFFICE
CERTIFICATE OF CORRECTION

PATENT NO. : 7,366,153 B2  Page 1 of 1
APPLICATION NO. : 10/833464
DATED : April 29, 2008
INVENTOR(S) : Janczak It is certified that error appears in the above-identified patent and that said Letters Patent is hereby corrected as shown below:

In column 8, line 63, in Claim 7, delete "N and if" and insert -- N, and, if --, therefor.

In column 9, line 47, in Claim 16, delete "N and if" and insert -- N, and, if --, therefor.

In column 10, line 30, in Claim 25, delete "N and if" and insert -- N, and, if --, therefor.

In column 10, line 42, in Claim 26, after "number" delete "." and insert -- , --, therefor.

In column 11, line 15, in Claim 32, delete "N and if" and insert -- N, and, if --, therefor.

In column 12, line 16, in Claim 37, delete "b <N" and insert -- b<N --, therefor.

In column 12, line 43, in Claim 44, delete "N/GWinc" and insert -- N/CWinc --, therefor.

Signed and Sealed this

Second Day of September, 2008

JON W. DUDAS
*Director of the United States Patent and Trademark Office*